(12) United States Patent
Lo

(10) Patent No.: US 7,165,704 B2
(45) Date of Patent: Jan. 23, 2007

(54) BICYCLE FIXING RACK ASSEMBLY FOR WHEELED VEHICLE

(76) Inventor: Yung-Sheng Lo, No. 165, Chien Cheng St., Chiayi (TW)

( * ) Notice: Subject to any disclaimer, the term of this patent is extended or adjusted under 35 U.S.C. 154(b) by 608 days.

(21) Appl. No.: 10/690,734

(22) Filed: Oct. 21, 2003

(65) Prior Publication Data

US 2005/0082328 A1   Apr. 21, 2005

(51) Int. Cl.
*B60R 9/00* (2006.01)
*B60R 11/00* (2006.01)

(52) U.S. Cl. ............... 224/499; 224/506; 224/924; 224/536; 224/570

(58) Field of Classification Search .......... 224/499, 224/506, 924, 525, 536, 570, 558
See application file for complete search history.

(56) References Cited

U.S. PATENT DOCUMENTS

| | | | | | |
|---|---|---|---|---|---|
| 1,482,770 | A | * | 2/1924 | Terrell | 224/500 |
| 1,808,042 | A | * | 6/1931 | Kennedy | 224/499 |
| 3,800,967 | A | * | 4/1974 | Kosecoff | 414/462 |
| 3,901,421 | A | * | 8/1975 | Kalicki et al. | 224/310 |
| 4,772,164 | A | * | 9/1988 | McFarland | 410/3 |
| 4,875,608 | A | * | 10/1989 | Graber | 224/493 |
| 5,445,300 | A | * | 8/1995 | Eipper et al. | 224/496 |
| 5,762,248 | A | * | 6/1998 | Englander et al. | 224/324 |
| 5,803,330 | A | * | 9/1998 | Stack et al. | 224/518 |

* cited by examiner

*Primary Examiner*—Tri M. Mai
(74) *Attorney, Agent, or Firm*—Alan D. Kamrath; Nikolai & Mersereau, P.A.

(57) ABSTRACT

A bicycle fixing rack assembly includes a main frame, a plurality of X-shaped fixing plates, two pivot units, and a plurality of clamping units. Thus, the seat tube of the bicycle is clamped between the two clamping blocks of the respective clamping unit, so that the bicycle is fixed by the respective clamping unit rigidly and stably without detachment.

20 Claims, 16 Drawing Sheets

150
BICYCLE FIXING RACK ASSEMBLY FOR WHEELED VEHICLE

BACKGROUND OF THE INVENTION

1. Field of the Invention

The present invention relates to a bicycle fixing rack assembly, and more particularly to a bicycle fixing rack assembly for a wheeled vehicle, such as the automobile or the like.

2. Description of the Related Art

A conventional bicycle fixing rack is mounted on a wheeled vehicle, such as the automobile or the like, for supporting and fixing a bicycle, so that the bicycle can be mounted on the wheeled vehicle by the bicycle fixing rack.

However, the conventional bicycle fixing rack has a fixed size without adjustment, so that the conventional bicycle fixing rack is not suitable wheeled vehicles of different sizes, thereby greatly limiting the versatility of the conventional bicycle fixing rack.

SUMMARY OF THE INVENTION

The primary objective of the present invention is to provide a bicycle fixing rack assembly having an adjustment function, so that the bicycle fixing rack assembly is suitable wheeled vehicles of different sizes.

Another objective of the present invention is to provide a bicycle fixing rack assembly, wherein the seat tube of the bicycle is clamped between the two clamping blocks of the respective clamping unit, and the bicycle is fixed by the respective clamping unit rigidly and stably without detachment.

A further objective of the present invention is to provide a bicycle fixing rack assembly, wherein the inclined angle of each of the two pivot units can be adjusted arbitrarily, so as to fit the inclined angle of the wheeled vehicle.

A further objective of the present invention is to provide a bicycle fixing rack assembly, wherein the clamping head of one of the clamping units can be pivoted to clamp the support bar of the support rack of the main frame, so as to fold the main frame.

In accordance with the present invention, there is provided a bicycle fixing rack assembly, comprising a main frame, and a plurality of clamping units, wherein:

the main frame includes an inverted U-shaped first adjusting rack; and each of the clamping units is mounted on the first adjusting rack of the main frame and includes a snapping member pivotally mounted the first adjusting rack of the main frame, an extension bolt having a first end secured on the snapping member, a fixing tube mounted on the extension bolt and having a first end rested on the snapping member, a clamping head mounted on the extension bolt and rested on a second end of the fixing tube, and a control knob mounted on a second end of the extension bolt and rested on a bottom of the clamping head.

Further benefits and advantages of the present invention will become apparent after a careful reading of the detailed description with appropriate reference to the accompanying drawings.

DETAILED DESCRIPTION OF THE INVENTION

Figure 1:
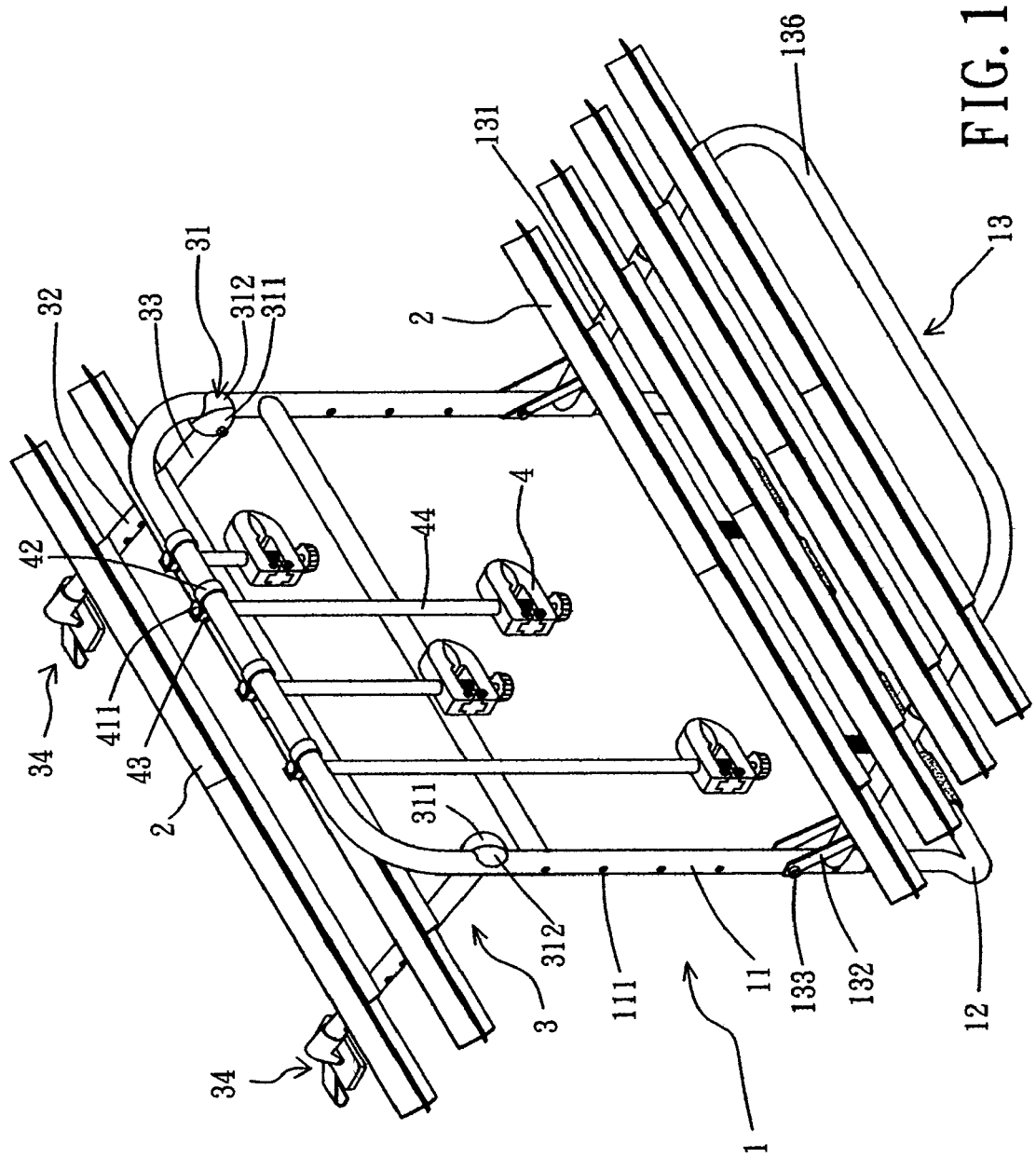
FIG. 1 is a perspective view of a bicycle fixing rack assembly in accordance with the preferred embodiment of the present invention.
Figure 2:
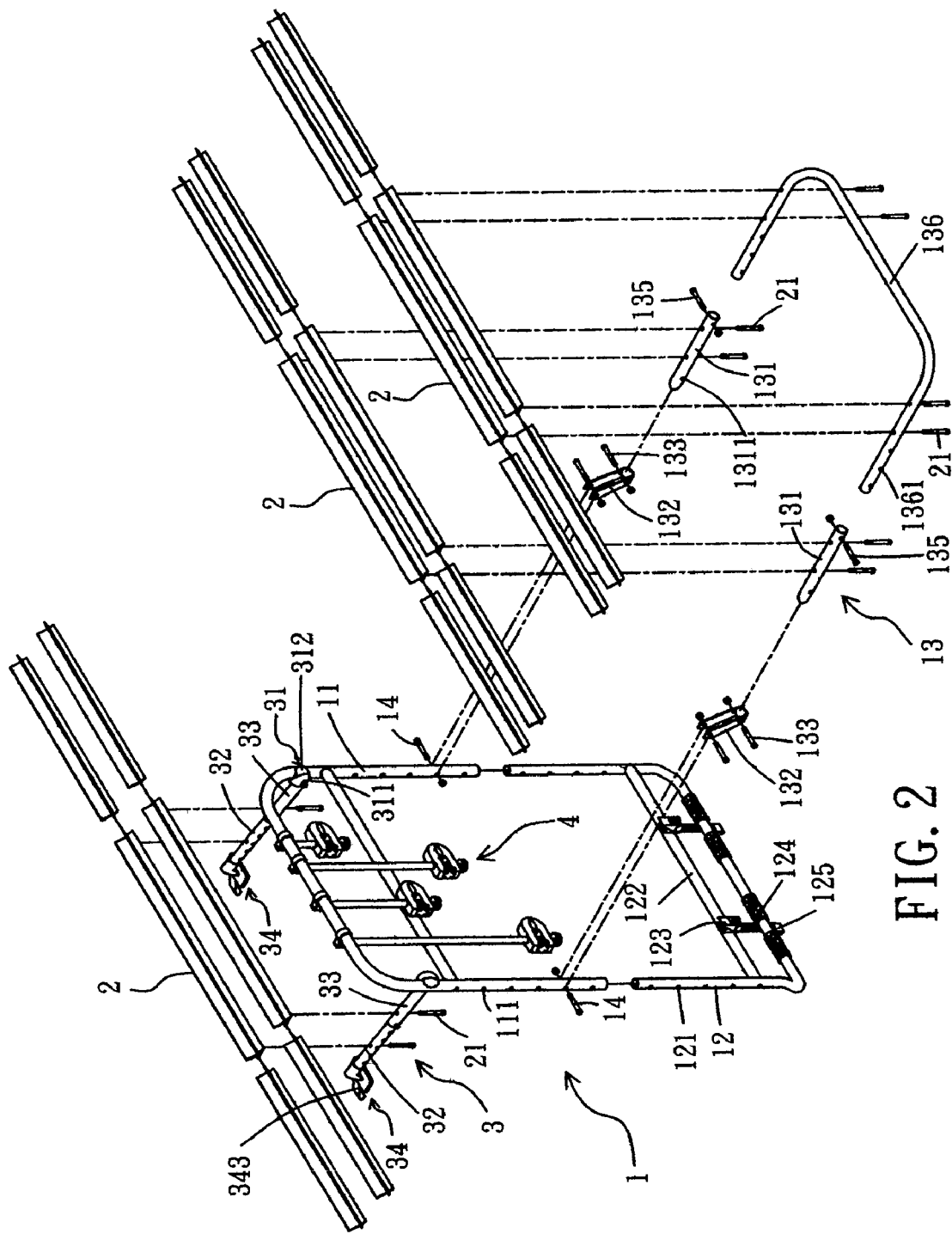
FIG. 2 is an exploded perspective view of the bicycle fixing rack assembly as shown in FIG. 1.
Figure 3:
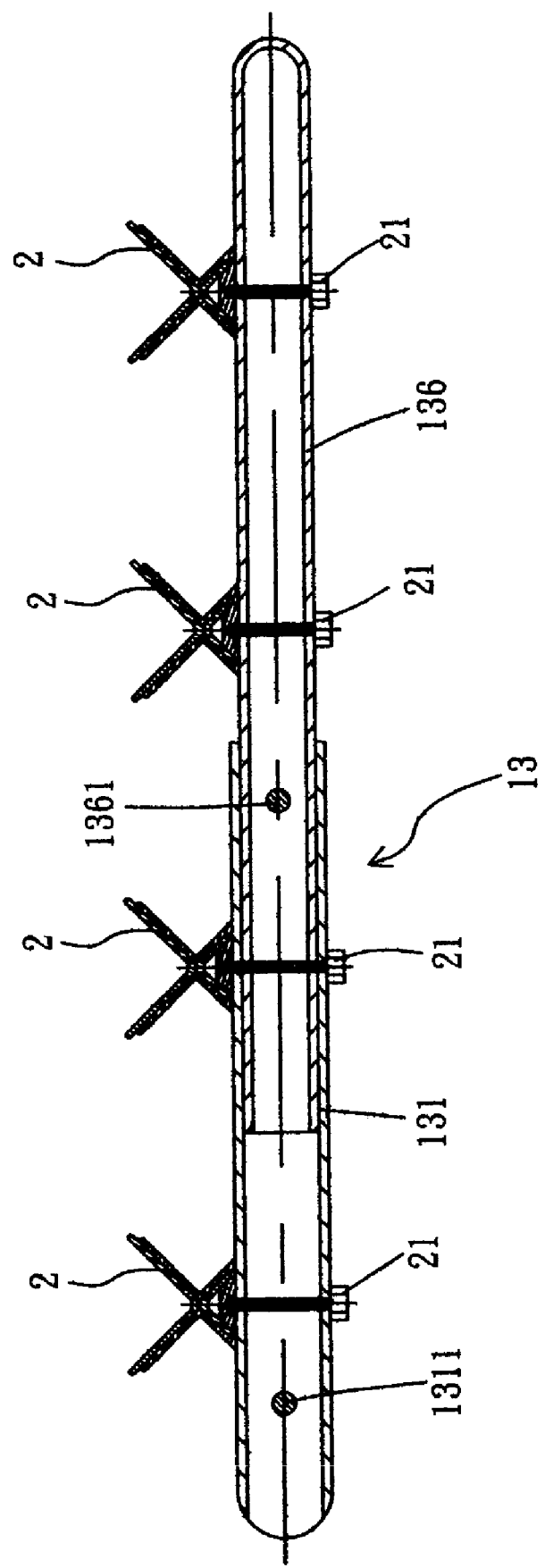
FIG. 3 is a partially plan cross-sectional view of the bicycle fixing rack assembly as shown in FIG. 1.
Figure 4:
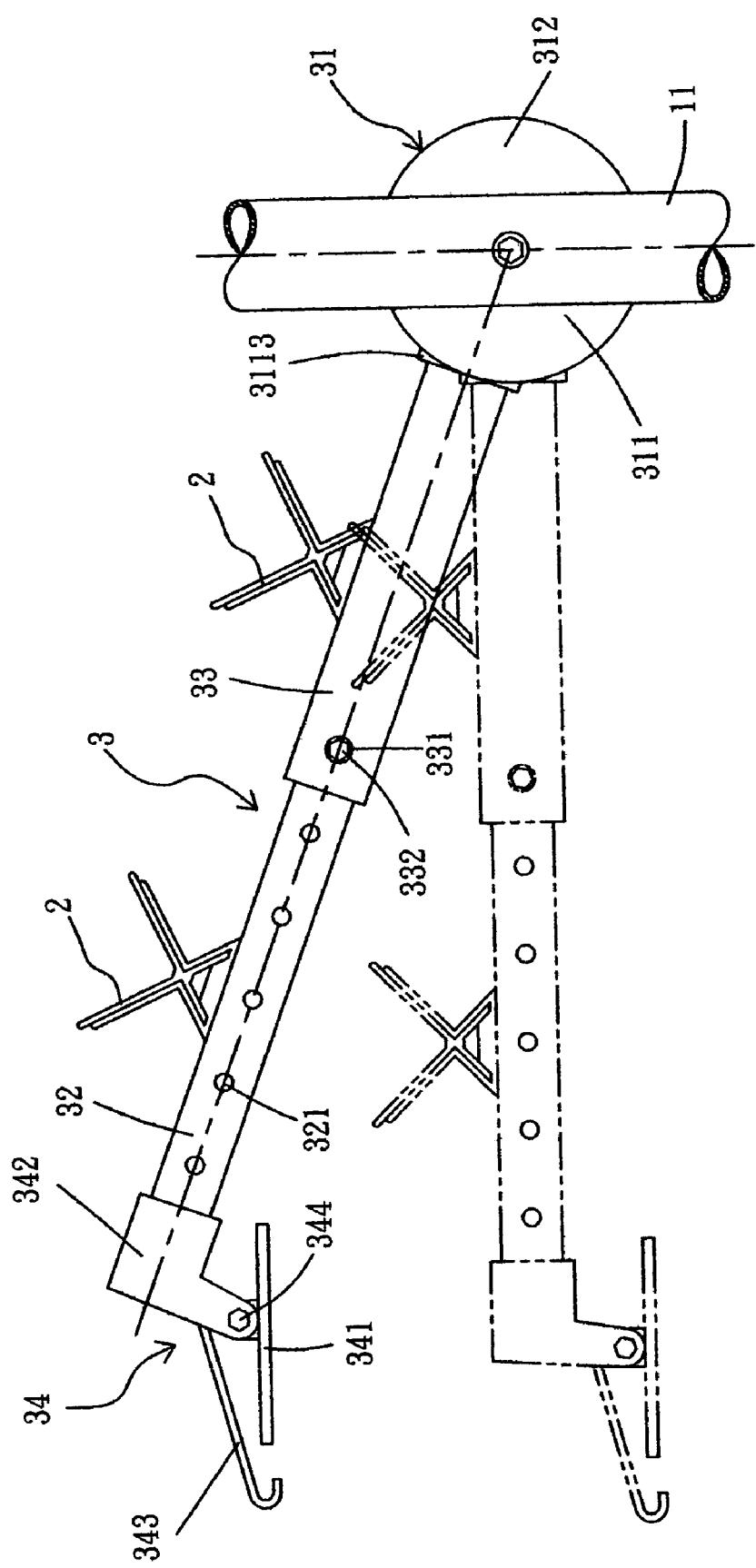
FIG. 4 is a partially cut-away plan operational view of the bicycle fixing rack assembly as shown in FIG. 1.
Figure 5:
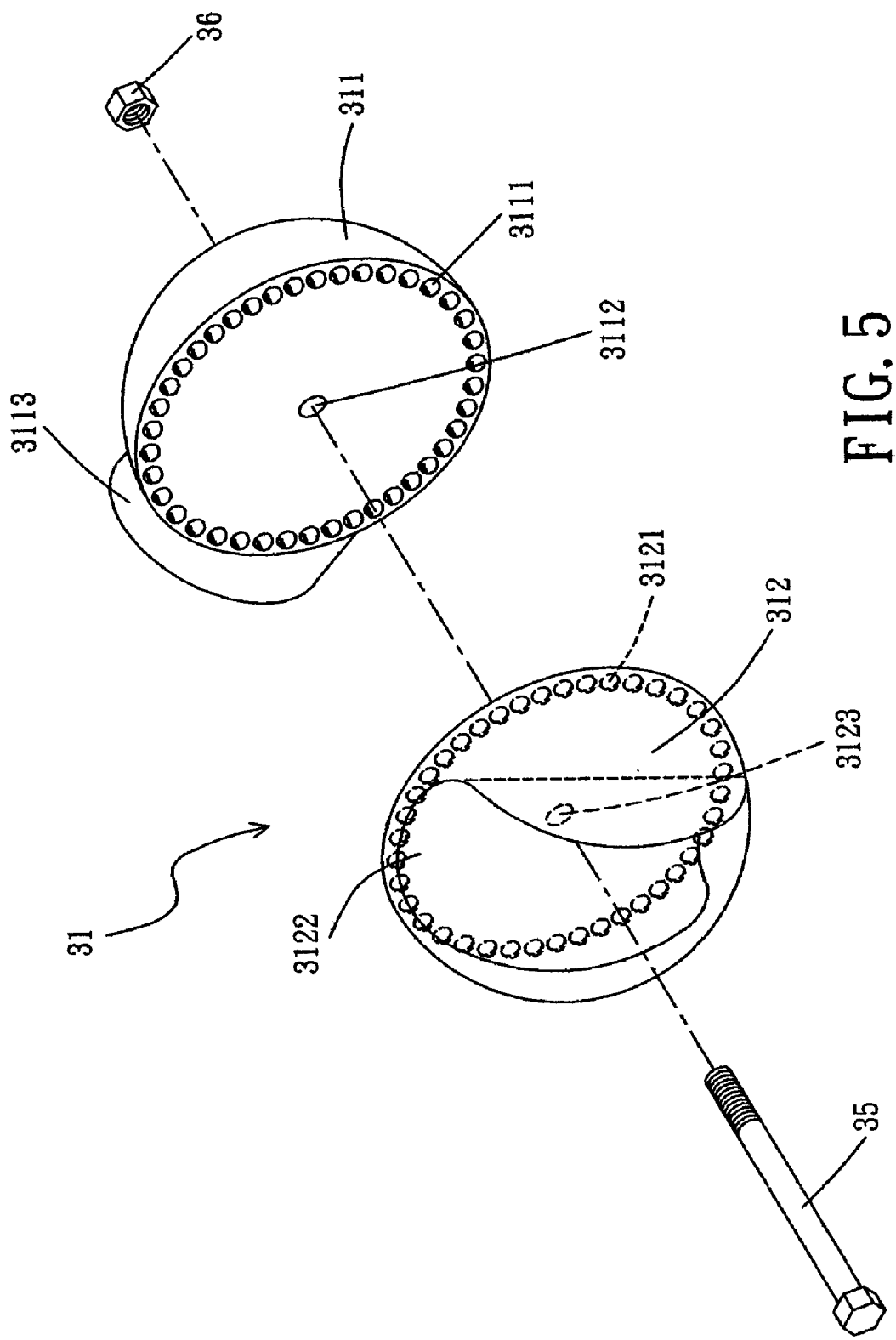
FIG. 5 is an exploded perspective view of a rotation member of the bicycle fixing rack assembly as shown in FIG. 1.
Figure 7:
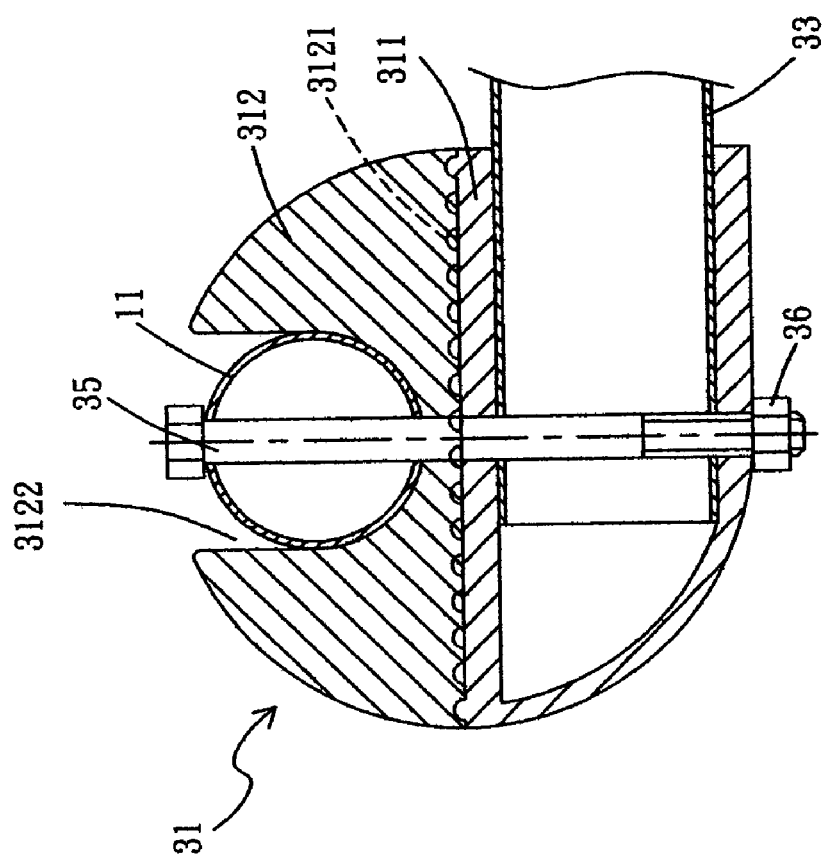
FIG. 7 is a plan assembly view of the rotation member of the bicycle fixing rack assembly as shown in FIG. 6.
Figure 6:
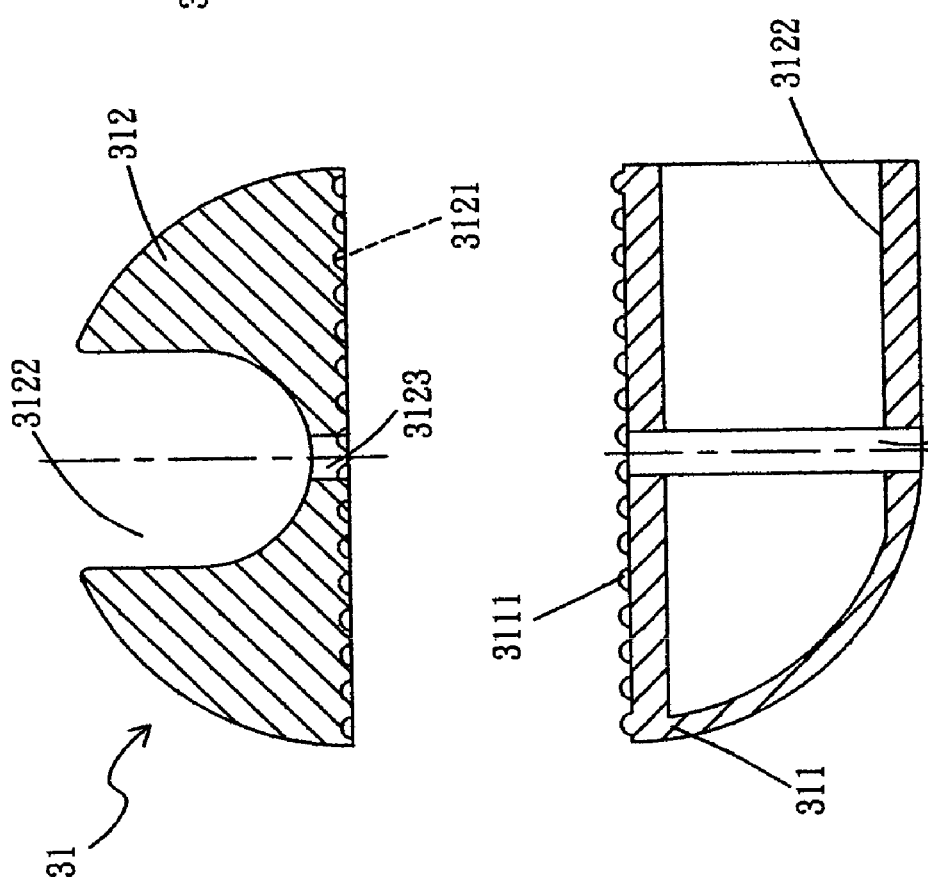
FIG. 6 is a plan cross-sectional view of the rotation member of the bicycle fixing rack assembly as shown in FIG. 5.
Figure 8:
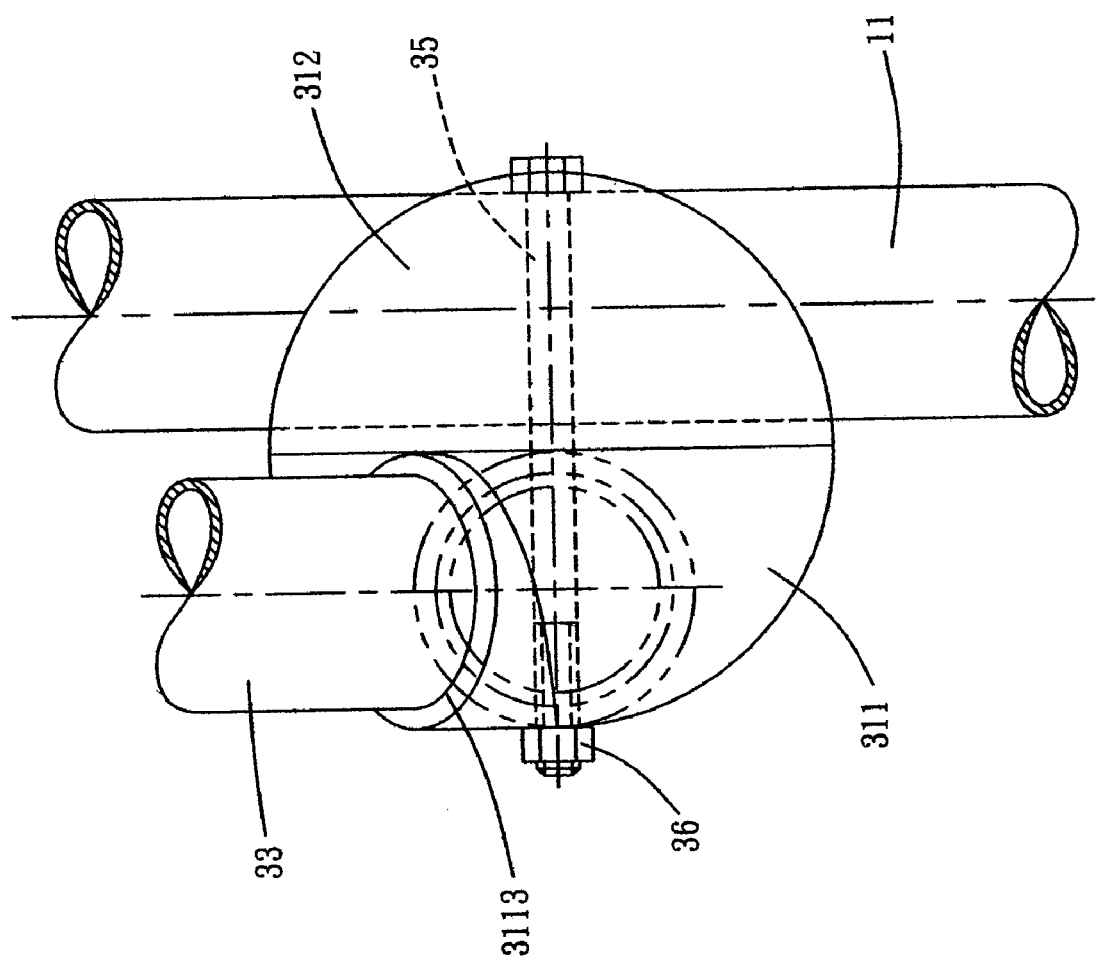
FIG. 8 is a plan assembly view of the rotation member of the bicycle fixing rack assembly as shown in FIG. 5.

Referring to the drawings and initially to FIGS. 1–3, a bicycle fixing rack assembly in accordance with the preferred embodiment of the present invention comprises a main frame 1, a plurality of X-shaped fixing plates 2, two pivot units 3, and a plurality of clamping units 4.

The main frame 1 includes an inverted U-shaped first adjusting rack 11, a U-shaped second adjusting rack 11, and a support rack 13.

The first adjusting rack 11 of the main frame 1 has two sides each formed with a plurality of adjusting holes 111.

The second adjusting rack 12 of the main frame 1 is movably mounted on a lower end of the first adjusting rack 11 and has two sides each formed with a plurality of adjusting holes 121. The second adjusting rack 12 of the main frame 1 is combined with the first adjusting rack 11 by two bolts 14. The second adjusting rack 12 of the main frame 1 has a lower end provided with a crossbar 122, two hooks 123 each mounted on the crossbar 122 and each provided with a rope 124 which has a distal end provided with a claw 125.

The support rack 13 of the main frame 1 is pivotally mounted on the first adjusting rack 11 of the main frame 1, and includes two pivot tubes 131 each pivotally mounted on the respective side of the first adjusting rack 11 by a U-shaped pivot seat 132 and two bolts 133, and a U-shaped support bar 136 movably mounted on the two pivot tubes 131. Each of the two pivot tubes 131 of the support rack 13 is formed with a plurality of adjusting holes 1311, and the support bar 136 of the support rack 13 has two sides each formed with a plurality of adjusting holes 1361. The support bar 136 is combined with the two pivot tubes 131 by two bolts 135.

Figure 12:
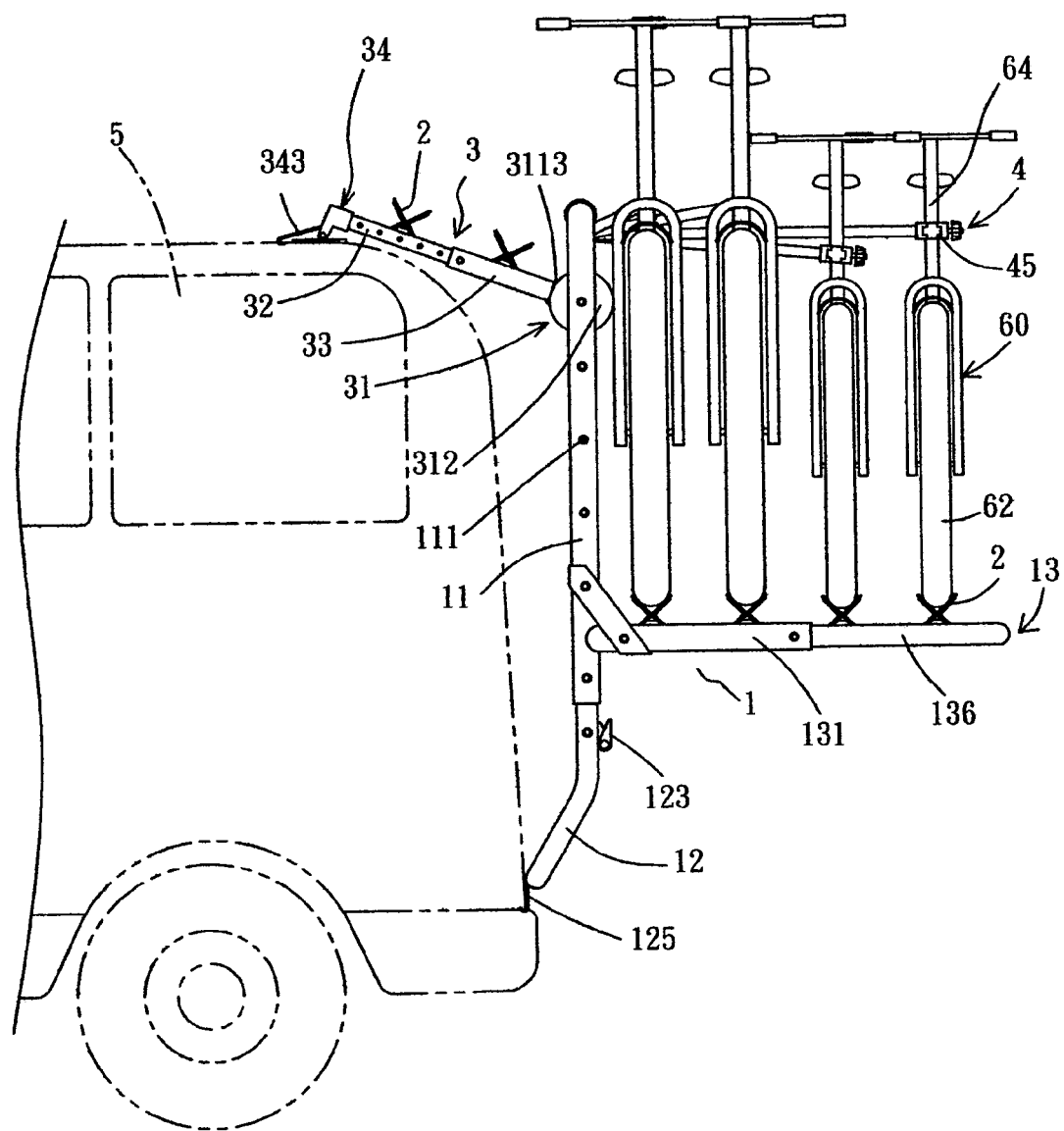
FIG. 12 is a side plan view showing the bicycle fixing rack assembly being mounted on a wheeled vehicle.

Each of the X-shaped fixing plates 2 is secured on the support rack 13 of the main frame 1 and the pivot units 3 for positioning the tires 62 of a bicycle 60 as shown in FIG. 12. Each of the X-shaped fixing plates 2 is secured on the support rack 13 of the main frame 1 by two bolts 21 as shown in FIG. 3.

Referring to FIGS. 4–8 with reference to FIGS. 1–3, each of the two pivot units 3 is pivotally mounted on the first adjusting rack 11 of the main frame 1, and includes a rotation member 31 secured on the respective side of the first adjusting rack 11, an outer tube 33 secured on the rotation member 31, an inner tube 32 movably mounted on the outer tube 33, and a fixing member 34 secured on the inner tube 32.

The rotation member 31 of each of the two pivot units 3 includes a semi-spherical first body 312 formed with a U-shaped recess 3122 for receiving the respective side of the first adjusting rack 11, and a semi-spherical second body 311 pivotally mounted on the first body 312 and provided with a mounting tube 3113. The first body 312 of the rotation member 31 of each of the two pivot units 3 has a periphery formed with a plurality of cavities 3121, and the second body 311 of the rotation member 31 of each of the two pivot units 3 has a periphery formed with a plurality of bosses 3111 each inserted into a respective one of the cavities 3121.

The outer tube 33 of each of the two pivot units 3 has a first end secured in the mounting tube 3113 of the second body 311 of the rotation member 31 and a second end formed with an adjusting hole 331.

The rotation member 31 of each of the two pivot units 3 further includes a bolt 35 extended through the respective side of the first adjusting rack 11 of the main frame 1, a hole 3123 formed in the first body 312, a hole 3112 formed in the second body 311 and the first end of the outer tube 33 of each of the two pivot units 3, and a nut 36 screwed on the bolt 35, so that the rotation member 31 of each of the two pivot units 3 is secured on the respective side of the first adjusting rack 11 of the main frame 1, the first body 312 of the rotation member 31 of each of the two pivot units 3 is combined with the second body 311, and the outer tube 33 of each of the two pivot units 3 is secured in the mounting tube 3113 of the second body 311 of the rotation member 31.

The inner tube 32 of each of the two pivot units 3 is formed with a plurality of adjusting holes 321. The outer tube 33 is combined with the inner tube 32 by a bolt 332.

The fixing member 34 of each of the two pivot units 3 includes a rotation block 342 mounted on an end of the inner tube 32, a fixing block 341 mounted on the rotation block 342 by a screw 344, and a claw 343 mounted on a side of the rotation block 342.

Figure 9:
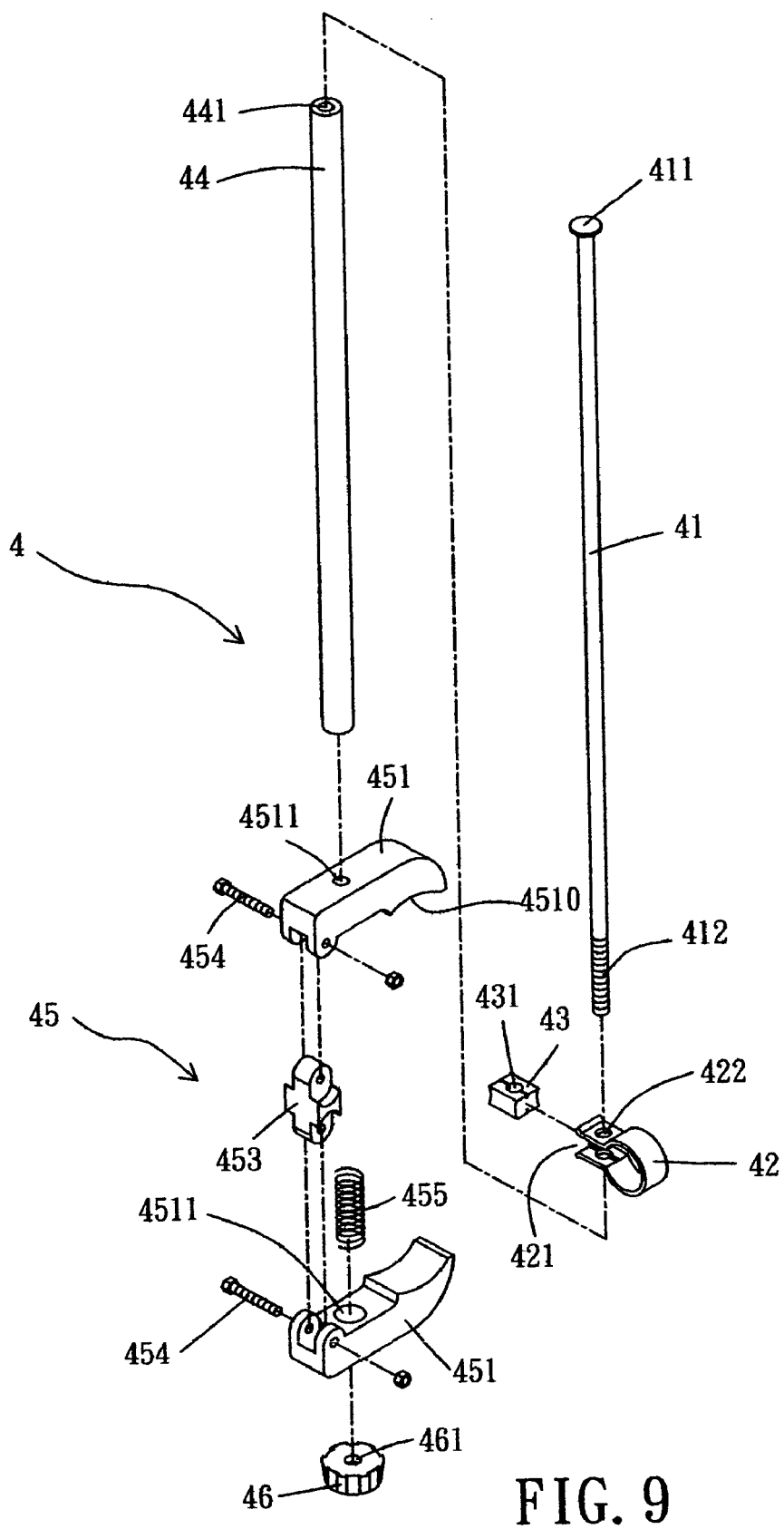
FIG. 9 is an exploded perspective view of a clamping unit of the bicycle fixing rack assembly as shown in FIG. 1.
Figure 10:
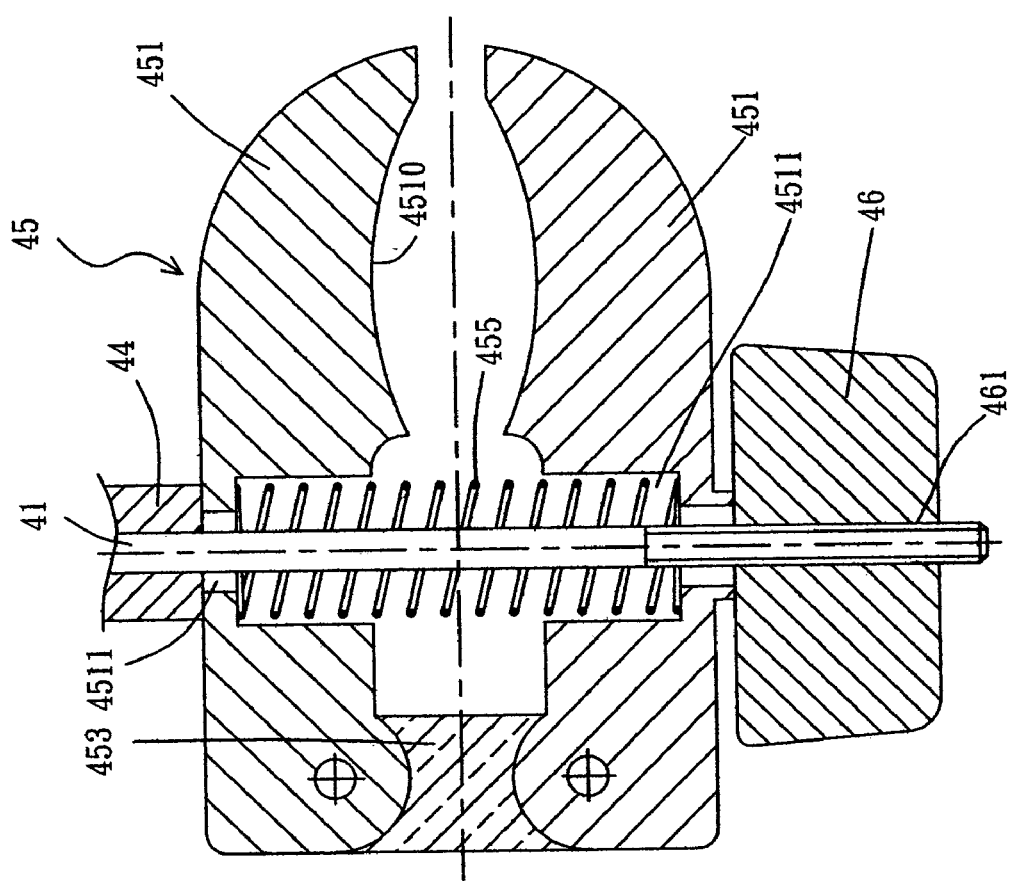
FIG. 10 is a partially cut-away plan cross-sectional assembly view of the clamping unit of the bicycle fixing rack assembly as shown in FIG. 9.
Figure 11:
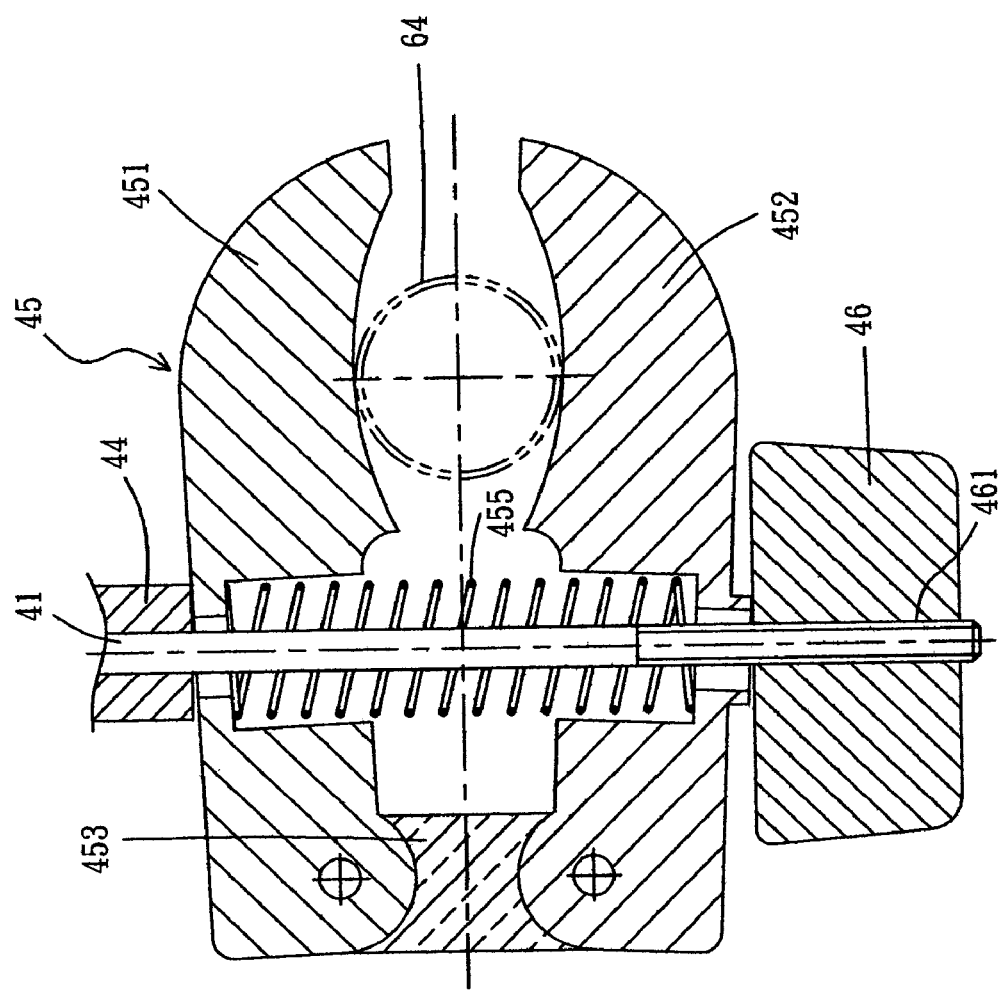
FIG. 11 is a schematic operational view of the clamping unit of the bicycle fixing rack assembly as shown in FIG. 10.

Referring to FIGS. 9–11 with reference to FIGS. 1–3, each of the clamping units 4 is mounted on the first adjusting rack 11 of the main frame 1, and includes a snapping member 42 pivotally mounted the first adjusting rack 11 of the main frame 1, an extension bolt 41 having a first end secured on the snapping member 42, a fixing tube 44 mounted on the extension bolt 41 and having a first end rested on the snapping member 42, a clamping head 45 mounted on the extension bolt 41 and rested on a second end of the fixing tube 44, and a control knob 46 mounted on a second end of the extension bolt 41 and rested on a bottom of the clamping head 45.

The snapping member 42 of each of the clamping units 4 has two distal ends each formed with a through hole 422 for mounting the extension bolt 41, and each of the clamping units 4 further includes a positioning block 43 mounted in an opening 421 defined between the two distal ends of the snapping member 42 and formed with a through hole 431 for mounting the extension bolt 41.

The first end of the extension bolt 41 of each of the clamping units 4 is formed with a catch head 411 rested on the snapping member 42.

The fixing tube 44 of each of the clamping units 4 is formed with a through hole 441 for mounting the extension bolt 41.

The clamping head 45 of each of the clamping units 4 includes two clamping blocks 451 each having a first end formed with an arcuate recess 4510 for securing the seat tube 64 of the bicycle 60 as shown in FIGS. 11 and 12, a mediate portion formed with a stepped hole 4511 for passage of the extension bolt 41, and a second end pivotally connected with a pivot block 453 by a bolt 454, and a spring 455 mounted on the extension bolt 41 and urged between the two clamping blocks 451. Preferably, the spring 455 is received in the stepped hole 4511 of each of the two clamping blocks 451.

The control knob 46 of each of the clamping units 4 is formed with a screw bore 461, and the second end of the extension bolt 41 of each of the clamping units 4 is formed with an outer thread 412 screwed into the screw bore 461 of the control knob 46.

In practice, referring to FIGS. 12–17 with reference to FIGS. 1–11, the main frame 1 is mounted on a wheeled vehicle 5, with the claw 343 of the fixing member 34 of each of the two pivot units 3 being closely hooked on the connection of the upper portion of the wheeled vehicle 5, and with the claw 125 of each of the two hooks 123 of the second adjusting rack 12 of the main frame 1 being hooked on the opening of the lower portion of the wheeled vehicle 5. In addition, the rope 124 is adjusted by each of the two hooks 123, so that the claw 125 of each of the two hooks 123 is closely hooked on the opening of the lower portion of the wheeled vehicle 5.

At this time, the nut 36 is unscrewed from the bolt 35, to release the first body 312 of the rotation member 31 of each of the two pivot units 3 from the second body 311, so that the bosses 3111 of the second body 311 of the rotation member 31 of each of the two pivot units 3 are detached from the cavities 3121 of the first body 312.

Figure 13:
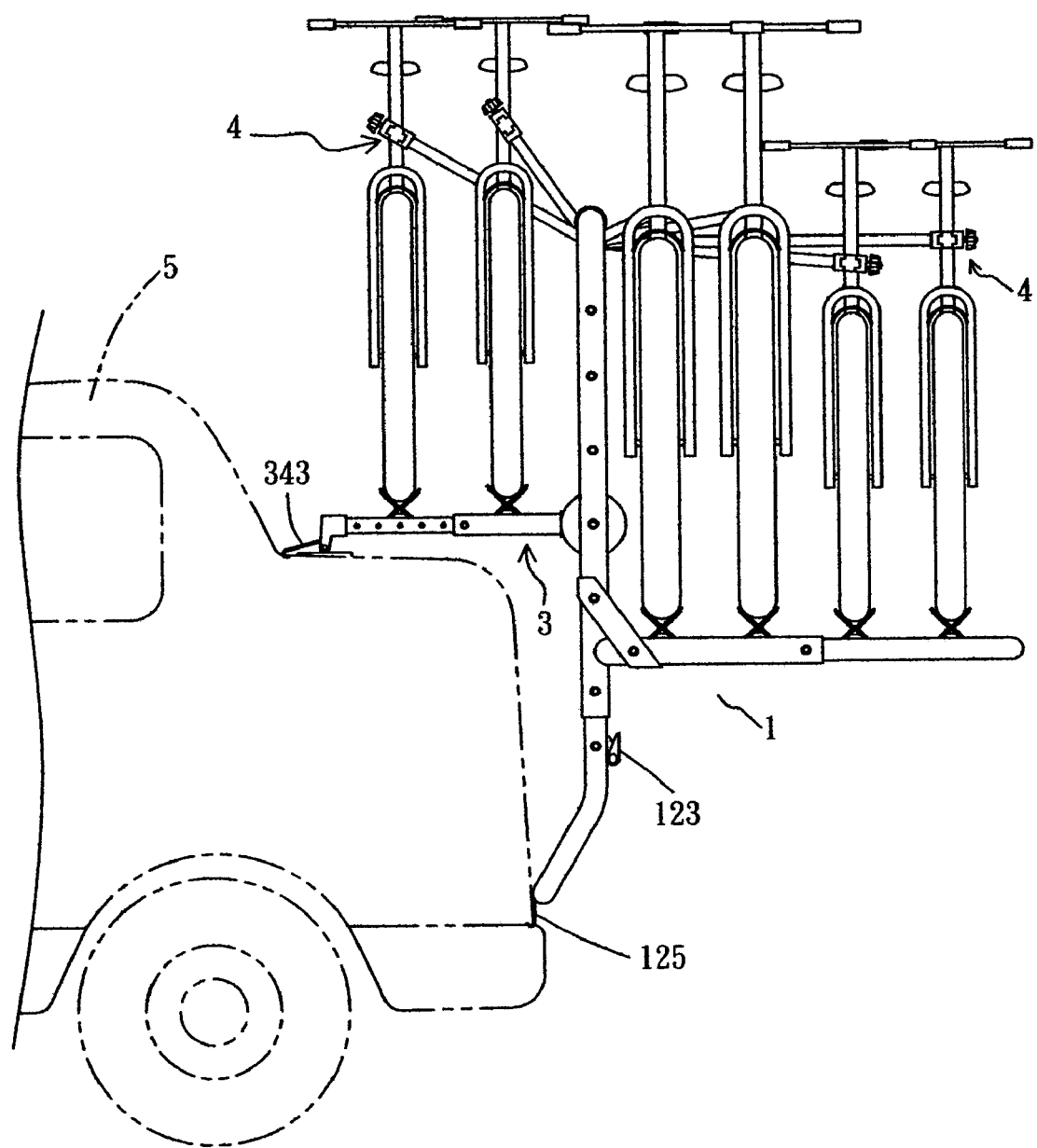
FIG. 13 is a side plan view showing the bicycle fixing rack assembly being mounted on a wheeled vehicle.
Figure 14:
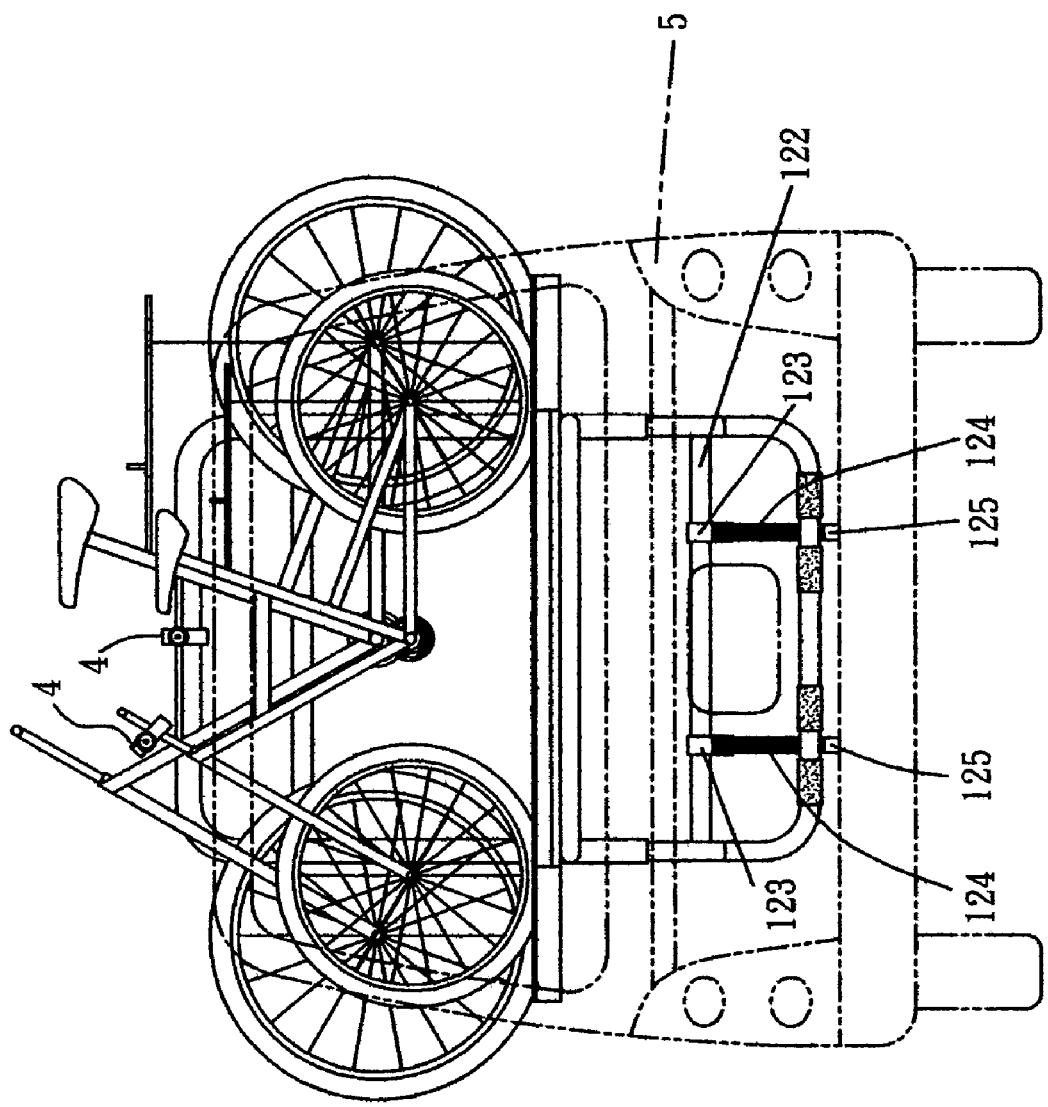
FIG. 14 is a front plan view of the bicycle fixing rack assembly as shown in FIG. 13.

Thus, the first body 312 of the rotation member 31 of each of the two pivot units 3 can be rotated relative to the second body 311, so as to adjust the included angle between the outer tube 33 of each of the two pivot units 3 and the first adjusting rack 11 of the main frame 1, so that the inclined angle of each of the two pivot units 3 can be adjusted arbitrarily as shown in FIGS. 12 and 13, so as to fit the inclined angle of the wheeled vehicle 5.

Each of the X-shaped fixing plates 2 is secured on the support rack 13 of the main frame 1 and the pivot unit 3 for positioning the tires 62 of the bicycle 60, and the clamping head 45 of each of the clamping units 4 can be pivoted to clamp the seat tube 64 of the bicycle 60 as shown in FIG. 12.

In assembly, the control knob 46 of each of the clamping units 4 is unscrewed from the extension bolt 41, so that the two clamping blocks 451 are moved outward relatively by the restoring force of the spring 455. Thus, the seat tube 64 of the bicycle 60 can be inserted between the two clamping blocks 451 as shown in FIG. 11. Then, the control knob 46 of each of the clamping units 4 is screwed and locked on the extension bolt 41 closely, so that the seat tube 64 of the bicycle 60 is clamped between the two clamping blocks 451, and the bicycle 60 is fixed by the respective clamping unit 4 rigidly and stably without detachment.

Figure 15:
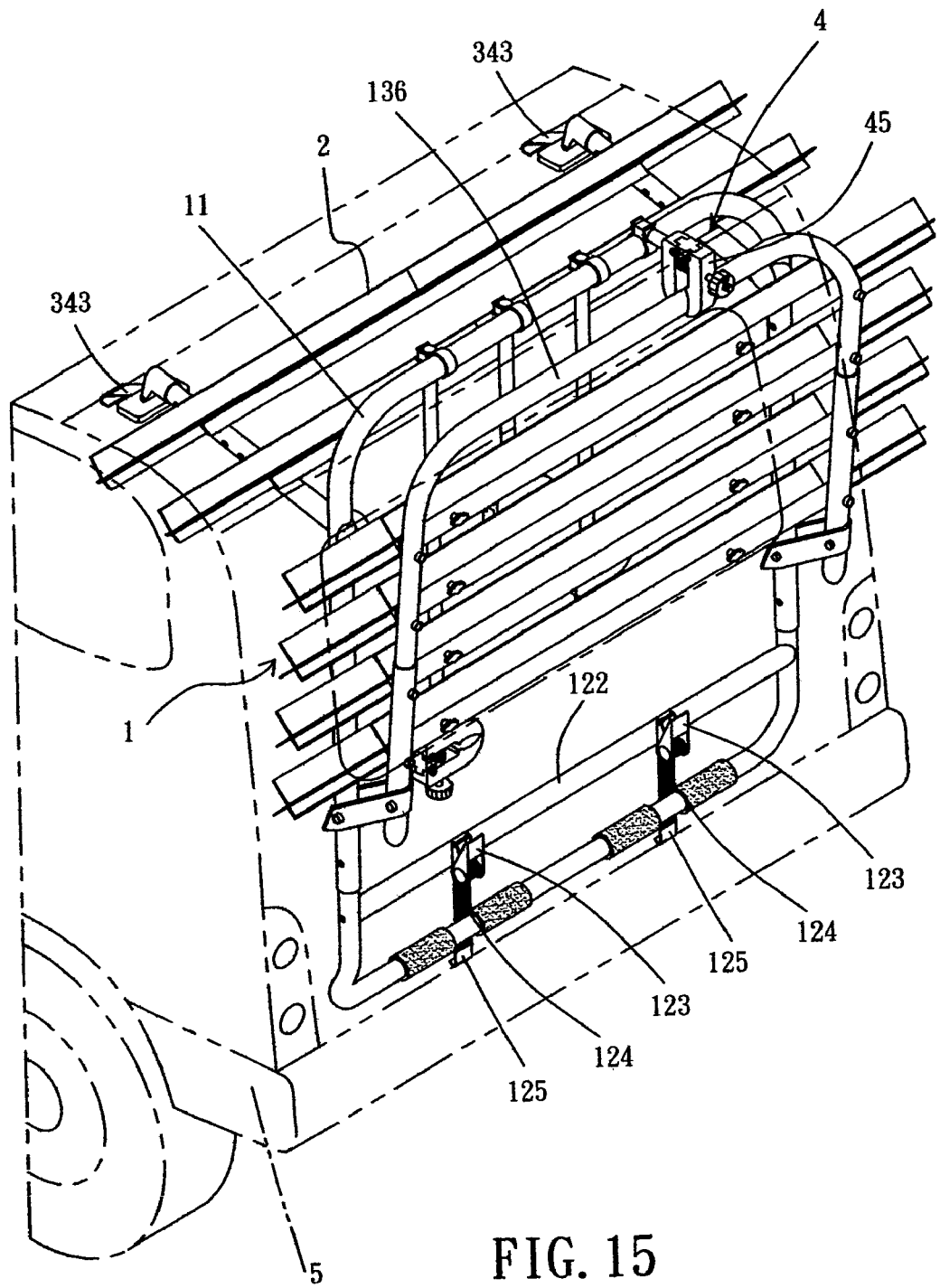
FIG. 15 is a perspective folded view of the bicycle fixing rack assembly as shown in FIG. 1.
Figure 16:
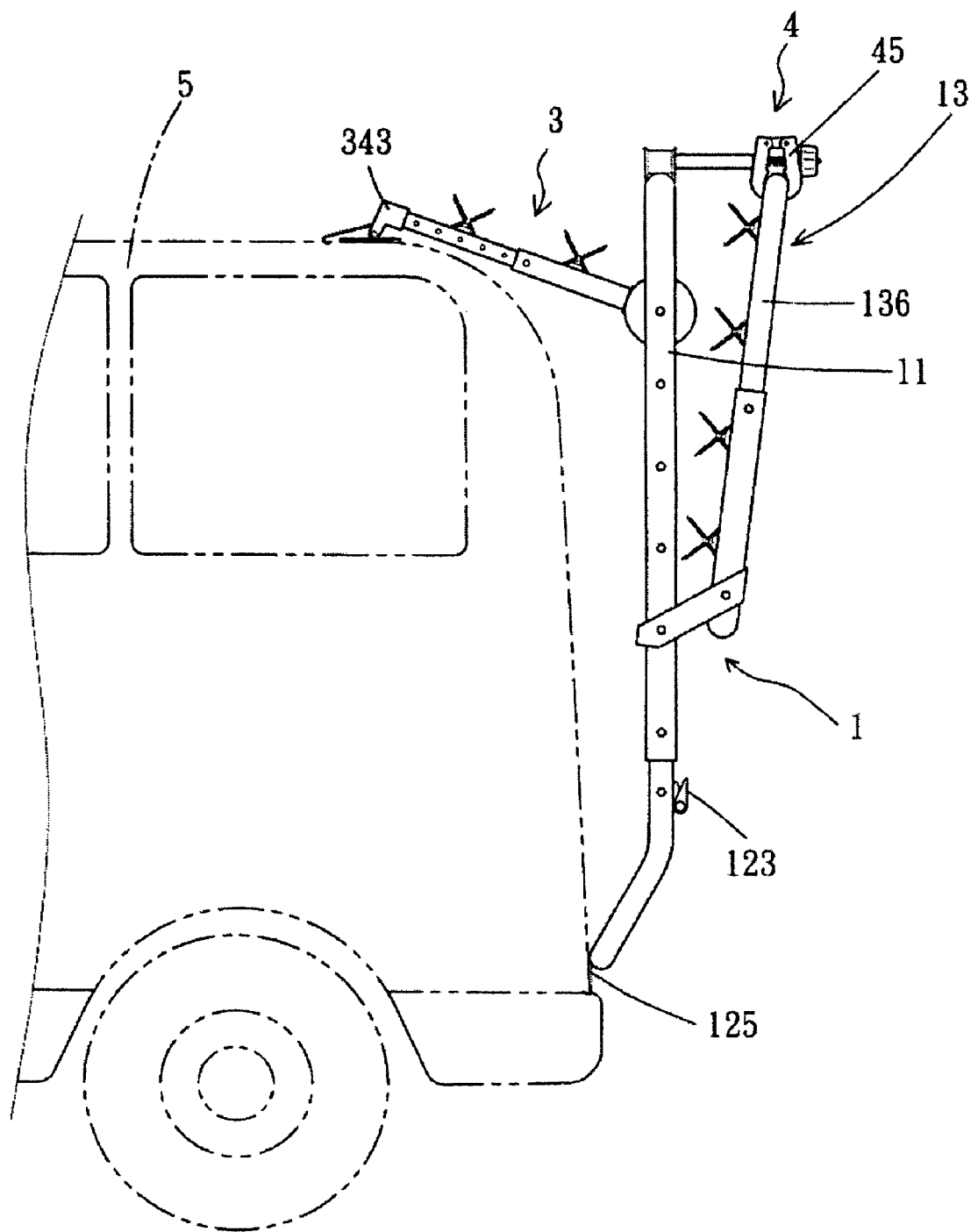
FIG. 16 is a side plan view of the bicycle fixing rack assembly as shown in FIG. 15.
Figure 17:
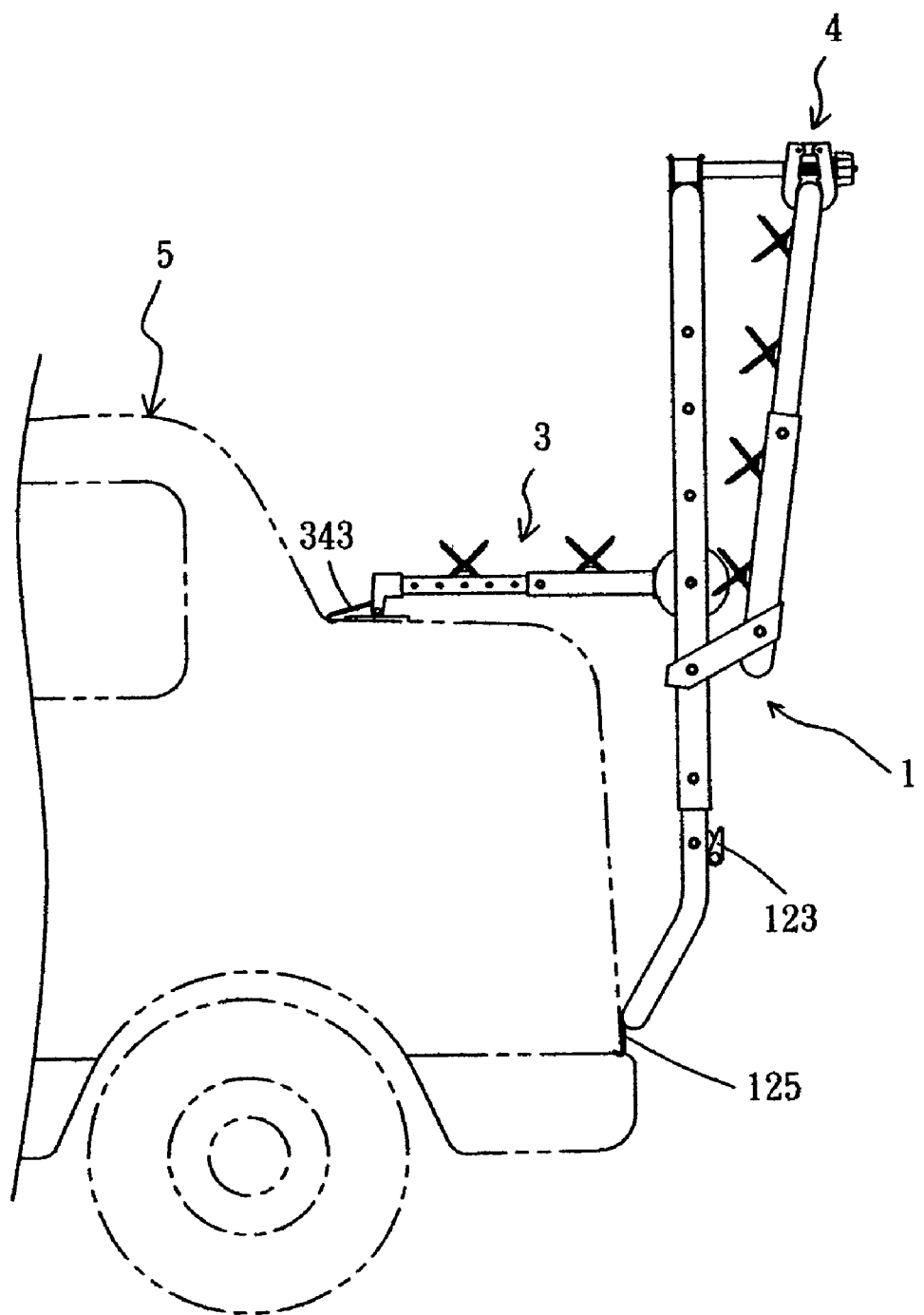
FIG. 17 is a side plan folded view of the bicycle fixing rack assembly as shown in FIG. 1.

As shown in FIGS. 15–17, the clamping head 45 of one of the clamping units 4 can be pivoted to clamp the support bar 136 of the support rack 13 of the main frame 1, so as to fold the main frame 1.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bicycle fixing rack assembly, comprising a main frame, and a plurality of clamping units, wherein:
    the main frame includes an inverted U-shaped first adjusting rack; and
    each of the clamping units is mounted on the first adjusting rack of the main frame and includes a snapping member pivotally mounted the first adjusting rack of the main frame, an extension bolt having a first end secured on the snapping member, a fixing tube mounted on the extension bolt and having a first end rested on the snapping member, a clamping head mounted on the extension bolt and rested on a second end of the fixing tube, and a control knob mounted on a second end of the extension bolt and rested on a bottom of the clamping head.

2. The bicycle fixing rack assembly in accordance with claim 1, wherein the snapping member of each of the clamping units has two distal ends each formed with a through hole for mounting the extension bolt.

3. The bicycle fixing rack assembly in accordance with claim 2, wherein each of the clamping units further includes a positioning block mounted in an opening defined between the two distal ends of the snapping member and formed with a through hole for mounting the extension bolt.

4. The bicycle fixing rack assembly in accordance with claim 1, wherein the first end of the extension bolt of each of the clamping units is formed with a catch head rested on the snapping member.

5. The bicycle fixing rack assembly in accordance with claim 1, wherein the fixing tube of each of the clamping units is formed with a through hole for mounting the extension bolt.

6. The bicycle fixing rack assembly in accordance with claim 1, wherein the clamping head of each of the clamping units includes two clamping blocks, and a spring mounted on the extension bolt and urged between the two clamping blocks.

7. The bicycle fixing rack assembly in accordance with claim 6, wherein each of the two clamping blocks has a first end formed with an arcuate recess, a mediate portion formed with a stepped hole for passage of the extension bolt, and a second end pivotally connected with a pivot block by a bolt, and the spring is received in the stepped hole of each of the two clamping blocks.

8. The bicycle fixing rack assembly in accordance with claim 1, wherein the control knob of each of the clamping units is formed with a screw bore, and the second end of the extension bolt of each of the clamping units is formed with an outer thread screwed into the screw bore of the control knob.

9. The bicycle fixing rack assembly in accordance with claim 1, further comprising two pivot units each pivotally mounted on the first adjusting rack of the main frame and each including a rotation member secured on a respective side of the first adjusting rack, an outer tube secured on the rotation member, an inner tube movably mounted on the outer tube, and a fixing member secured on the inner tube.

10. The bicycle fixing rack assembly in accordance with claim 9, wherein the rotation member of each of the two pivot units includes a semi-spherical first body formed with a U-shaped recess for receiving the respective side of the first adjusting rack, and a semi-spherical second body pivotally mounted on the first body and provided with a mounting tube.

11. The bicycle fixing rack assembly in accordance with claim 10, wherein the first body of the rotation member of each of the two pivot units has a periphery formed with a plurality of cavities, and the second body of the rotation member of each of the two pivot units has a periphery formed with a plurality of bosses each inserted into a respective one of the cavities.

12. The bicycle fixing rack assembly in accordance with claim 9, wherein the outer tube of each of the two pivot units has a first end secured in the mounting tube of the second body of the rotation member.

13. The bicycle fixing rack assembly in accordance with claim 12, wherein the rotation member of each of the two pivot units further includes a bolt extended through the respective side of the first adjusting rack of the main frame, a hole formed in the first body, a hole formed in the second body and the first end of the outer tube of each of the two pivot units, and a nut screwed on the bolt, so that the rotation member of each of the two pivot units is secured on the respective side of the first adjusting rack of the main frame, the first body of the rotation member of each of the two pivot units is combined with the second body, and the outer tube of each of the two pivot units is secured in the mounting tube of the second body of the rotation member.

14. The bicycle fixing rack assembly in accordance with claim 12, wherein the outer tube of each of the two pivot units has a second end formed with an adjusting hole, the inner tube of each of the two pivot units is formed with a plurality of adjusting holes, and the outer tube is combined with the inner tube by a bolt.

15. The bicycle fixing rack assembly in accordance with claim 9, wherein the fixing member of each of the two pivot units includes a rotation block mounted on an end of the inner tube, a fixing block mounted on the rotation block by a screw, and a claw mounted on a side of the rotation block.

16. The bicycle fixing rack assembly in accordance with claim 1, wherein the first adjusting rack of the main frame has two sides each formed with a plurality of adjusting holes, the main frame further includes a U-shaped second adjusting rack movably mounted on a lower end of the first adjusting rack and having two sides each formed with a plurality of adjusting holes, and the second adjusting rack of the main frame is combined with the first adjusting rack by two bolts.

17. The bicycle fixing rack assembly in accordance with claim 16, wherein the second adjusting rack of the main frame has a lower end provided with a crossbar, two hooks each mounted on the crossbar and each provided with a rope which has a distal end provided with a claw.

18. The bicycle fixing rack assembly in accordance with claim 1, wherein the main frame further includes a support rack pivotally mounted on the first adjusting rack of the main frame and including two pivot tubes each pivotally mounted on the respective side of the first adjusting rack by a U-shaped pivot seat and two bolts, and a U-shaped support bar movably mounted on the two pivot tubes, each of the two pivot tubes of the support rack is formed with a plurality of adjusting holes, the support bar of the support rack has two sides each formed with a plurality of adjusting holes, and the support bar is combined with the two pivot tubes by two bolts.

19. The bicycle fixing rack assembly in accordance with claim 18, further comprising a plurality of X-shaped fixing plates each secured on the support rack of the main frame by two bolts.

20. The bicycle fixing rack assembly in accordance with claim 9, further comprising a plurality of X-shaped fixing plates each secured on the pivot units.

* * * * *